United States Patent [19]

Sieglitz

[11] 4,266,570
[45] May 12, 1981

[54] ANGLE VALVE

[75] Inventor: Manfred Sieglitz, Bremen, Fed. Rep. of Germany

[73] Assignee: Gustav F. Gerdts KG, Bremen, Fed. Rep. of Germany

[21] Appl. No.: 971,983

[22] Filed: Dec. 21, 1978

Related U.S. Application Data

[63] Continuation-in-part of Ser. No. 935,287, Aug. 21, 1978.

[30] Foreign Application Priority Data

Aug. 25, 1977 [DE]  Fed. Rep. of Germany ....... 2738294
Sep. 21, 1977 [DE]  Fed. Rep. of Germany ....... 2742414

[51] Int. Cl.³ ..................... F16K 31/145; B65D 47/20
[52] U.S. Cl. .................................. 137/613; 251/61.4; 251/279; 222/506
[58] Field of Search .............. 137/613; 251/61.2, 61.4, 251/291, 339, 128, 144, 231, 232, 243, 236, 279; 222/501, 504, 506

[56] References Cited

U.S. PATENT DOCUMENTS

| | | | |
|---|---|---|---|
| 1,148,464 | 7/1915 | Sayer | 251/61 |
| 2,214,272 | 9/1940 | Dillman | 251/61 |
| 2,588,186 | 3/1952 | Wasson | 137/613 |
| 2,756,103 | 7/1956 | Creswell | 251/61 |
| 3,152,607 | 10/1964 | Lundeen | 251/61 |
| 3,438,392 | 4/1969 | Wilson | 137/613 |
| 3,970,280 | 7/1976 | Kunz | 251/62 |
| 4,128,391 | 12/1978 | Braunstein | 137/613 |

FOREIGN PATENT DOCUMENTS

| | | | |
|---|---|---|---|
| 5704 | 6/1901 | Fed. Rep. of Germany | 137/613 |
| 1013138 | 8/1957 | Fed. Rep. of Germany | 251/61.4 |
| 1124836 | 10/1956 | France | 137/613 |
| 466951 | 5/1966 | Japan | 251/231 |

Primary Examiner—Martin P. Schwadron
Assistant Examiner—A. Michael Chambers
Attorney, Agent, or Firm—Allison C. Collard; Thomas M. Galgano

[57] ABSTRACT

An angle valve is provided which is mountable on the exterior of a container having a container valve disposed therein and which includes a valve housing composed of a container-side connecting member having a front face and a channel formed therein opening onto the front face for communication with the container and a loading-side connecting member disposed at an angle to the container-side connecting member, which has a channel formed therethrough and which is capable of communication with a loading line. The valve housing further includes an intermediate connecting member having a receiving chamber formed therein which establishes communication between the channels of the loading-side and the container-side connecting members, with the loading-side connecting member disposed to discharge into the receiving chamber tangentially relative to the container-side connecting member. A valve seat is mounted within the receiving chamber, and a stroke-adjustable locking member is mounted within the receiving chamber and disposed for cooperative engagement with the valve seat. An actuating plunger is disposed in and extends through the channel of the container-side connecting member for coupling with the container valve disposed in the container, and a pneumatically-operable actuating member is supported on the housing and coupled to the actuating plunger. A manually-adjustable valve spindle is mounted in the receiving chamber and is coupled to the locking member with its axis at an angle to the front face of the container-side, connecting member such that its outer free end does not extend substantially above the remaining part of the valve.

10 Claims, 6 Drawing Figures

ANGLE VALVE

This application is a continuation-in-part of application Ser. No. 935,287, filed Aug. 21, 1978.

This invention relates to an angle or corner valve. More particularly, it relates to an angle valve which is mounted on the outside of a storage or transport container.

Such angle or corner valves which are used for filling or emptying containers are predominantly mounted on top of transport and storage containers. Only a limited construction height is available on such containers which usually is defined by the clearance height of a dome-shaped cover or, in a liquid container, by the height of the container frame.

A known embodiment of such angle valves which meets the requirement with respect to the construction height in some applications is disclosed in German design Pat. No. 72 45 394. However, in a series of individual applications, in particular, for liquid containers, this valve embodiment exceeds the construction height above the admissible value.

It is therefore an object of this invention to improve the angle valves of the aforementioned type in that low construction heights for the different types of containers can be realized.

The solution to the object of the invention is attained by the provision of an angle or corner valve mountable on the exterior of a container having a container valve disposed therein, which includes a valve housing composed of a container-side connecting member having a front face and a channel formed therein opening onto the front face for communication with the container, and a loading-side connecting member disposed at an angle to the container-side connecting member, which has a channel formed therethrough and which is capable of communication with a loading line. The valve housing further includes an intermediate connecting member having a receiving chamber formed therein which establishes communication between the channels of the loading-side and the container-side connecting members, with the loading-side connecting member disposed to discharge into the receiving chamber tangentially relative to the container-side connecting member. A valve seat is mounted within the receiving chamber, preferably either in the discharge opening of the receiving chamber opening into the channel of the container-side connecting member or in the discharge opening leading to the channel of the loading-side connecting member. The valve further includes a stroke-adjustable locking member or valve head mounted within the receiving chamber and disposed for cooperative engagement with the valve seat, and a manually-adjustable valve spindle or stem mounted in the receiving chamber and coupled to the locking member which is mounted with its axis substantially parallel relative to the front face of the container-side connecting member or at a slight angle thereto. In addition, an actuation plunger is disposed in and extends through the channel of the container-side connecting member for coupling with the container valve disposed in the container, and a pneumatically-operable actuating member is supported on the housing and coupled to the actuating plunger.

Due to the specific positioning of the valve spindle in a substantially parallel manner relative to the container-side connecting member front face of the corner valve, the construction height necessary for mounting the valve shut off together with the required actuating means may be kept particularly low. The substantial length of the valve spindle caused by the relatively large construction length of the spindle bearing or mount has no influence on the construction height. The pneumatically-driven actuating member for the inner container valve may be mounted, as far as its height is concerned, immediately above the connecting member receiving chamber, without experiencing a compromise of impairment in its cross section by the valve spindle. This results in a particularly compact construction.

In the embodiment of the invention wherein the valve member is mounted at a slightly inclined diverging manner with respect to the actuating member and the aforementioned front face, the diverging angle is chosen in such a manner that the free end of the valve spindle, or a stationary mounted handle thereon, does not extend above the pneumatically-driven actuating member.

Preferably, the container-side connecting member has a flange which defines the front face thereof, the receiving chamber is disposed adjacent to and upwardly of the flange and the loading-side connecting member is disposed at an angle to the front face and has an inner end coupled to the intermediate member and an outer end ascending away from the front face. These features result in a further reduction of the construction height of the corner valve.

Most advantageously, the first discharge opening of the receiving chamber communicating with the channel of the container-side connecting member and the second discharge opening of the receiving chamber communicating with the channel of the loading-side connecting member, have axes which are disposed substantially at a right angle with respect to each other. Most desirably, the intermediate member is mounted on the container-side connecting member, extending radially outwardly therefrom, and has a free end on which is mounted a support which supports the valve spindle. In addition, it is preferable that the loading-side connecting member is disposed radially between the container-side connecting member and the support. A further noticeable reduction of the valve structure height is obtained by positioning the actuating member such that it is disposed laterally off-set with respect to the container-side connecting member. Most desirably, the actuating member includes a stroke shaft which is disposed substantially parallel to the plunger and a stroke transmission member coupling the stroke shaft to the plunger; the container-side connecting member being provided with a sealed wall through which the stroke transmission member extends.

As a result of the laterally offset arrangement of the actuating member with respect to the container-side connecting member of the valve housing, it is possible to mount the actuating member totally or at least substantially within the longitudinal range of the container-side connecting member. Therefore, the construction height of the actuating member does not add, at least not appreciably, to the dimension of the structural length of the connecting member. This results in a reduction of the valve construction height.

In order to provide a particularly simple and functionally safe actuating member, it is most desirable that the actuating member includes a shell eccentrically mounted on the container-side connecting member, a cover secured to the shell and a pneumatically-actuated membrane clamped between the cover and the shell which is coupled to the stroke shaft for effecting movement thereof.

In one particularly preferred embodiment, the stroke transmission member includes a transmission shaft extending through the sealed wall, a first crank arm disposed within the channel of the container-side connecting member and coupled to the transmission shaft and the plunger and a second crank arm disposed outside of the container-side connecting member and coupled to the transmission shaft and the stroke shaft.

In another particularly preferred embodiment, the stroke transmission member includes a lever, pivotably mounted on the housing and extending through a wall of the container-side connecting member, which lever has an inner end which is coupled with the actuating plunger and an outer end which is coupled to the stroke shaft.

Other objects and features of the present invention will become apparent from the following detailed description considered in connection with the accompanying drawings which disclose several embodiments of the invention. It is to be understood, however, that the drawings are designed for the purpose of illustration only and not as a definition of the limits of the invention.

In the drawings, wherein similar reference characters denote similar elements throughout the several views.

Figure 1:
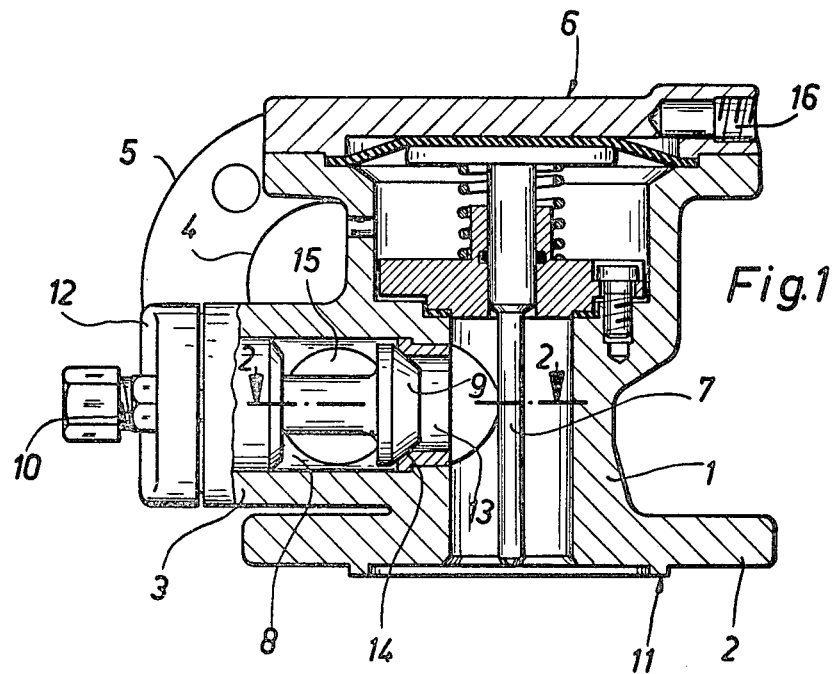
FIG. 1 is a sectional view, in part elevation, of an angle valve embodying the present invention taken along line 1—1 of FIG. 2.
Figure 2:
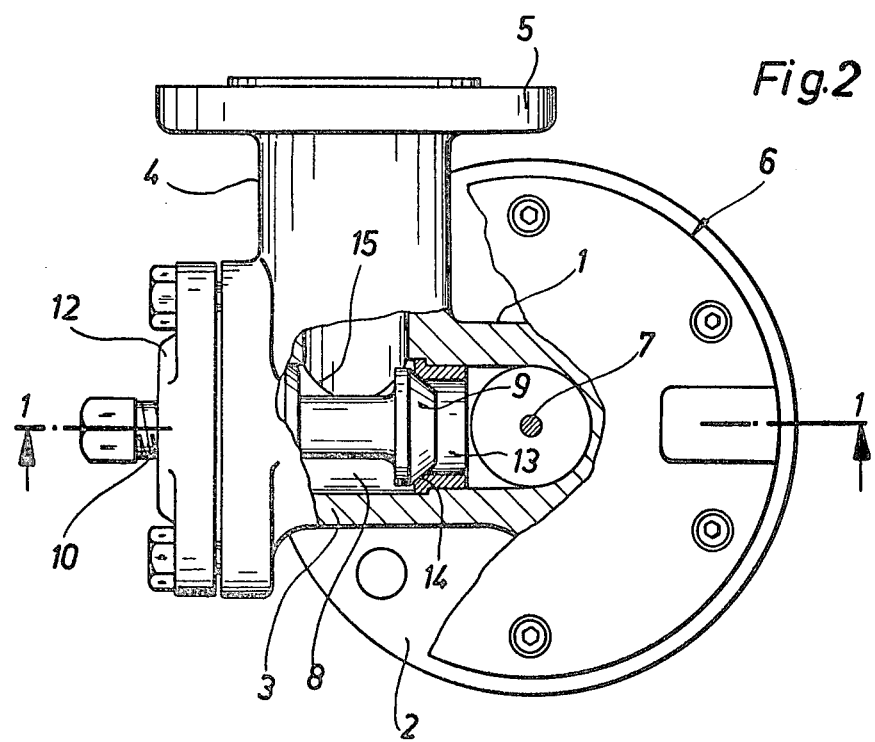
FIG. 2 is a plan view of the angle valve, shown in FIG. 1, and partially sectioned along line 2—2 of FIG. 1.
Figure 3:
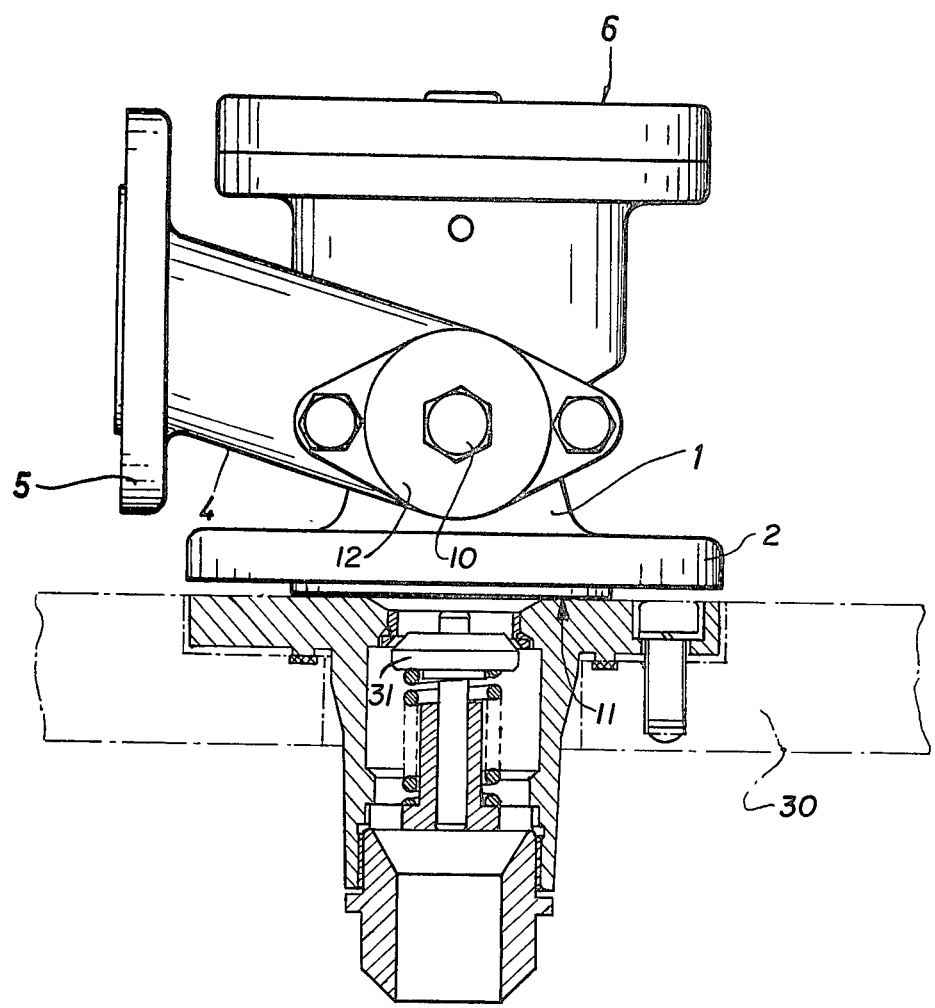
FIG. 3 is a side elevational view of the angle valve shown in FIGS. 1 and 2.

Referring now to the drawings, the angle valve shown in FIGS. 1-3 includes a housing with an associated connecting member 1 which may be coupled by means of a flange 2 outside of a transport or storage container 30 (see FIG. 3). Connecting member 1 is provided with a radially-positioned side-connecting piece 3 mounted immediately above flange 2. A further connecting piece 4 branches radially from side-connecting piece 3 and runs tangentially with respect to container-side connecting piece 1. Connecting piece 4 supports a flange 5 for coupling a loading or filling line (not shown).

A pneumatically-driven actuating member 6 is mounted on the container-side connecting piece which stroke adjusts an actuating plunger 7 extending through the container side connecting piece 1 for a cooperation with a second container valve 31 mounted inside the storage container (See FIG. 3). The latter valve is coupled in series with the angle valve as far as the medium flow is concerned. The interior of side-connecting piece 3 forms a receiving chamber 8 for a locking member or valve head 9 having a manually-actuated valve spindle or stem 10. The two latter mentioned parts are mounted with their axes parallel to the connecting front face 11 of container-side connecting piece 1. Side connecting piece 3 is provided at its free end with a support 12 provided with an associated threaded nut and a seal for valve spindle 10. Furthermore, a valve seat 14 for the locking member 9 is provided in the discharge opening 13 of receiving chamber 8 which opening leads into the chamber of container-side connecting piece 1. At a right angle to discharge opening 13, a discharge opening 15 of the receiving chamber 8 is located which leads into loading-side connecting piece 4. This connecting piece 4 runs obliquely ascending with respect to connecting front face 11 and towards its flange 5 which has a sufficient bottom clearance with respect to the container on which the valve is to be mounted.

Due to the parallel and close relationship of the valve spindle 10 with connecting front face 11, the elements which cooperate to serve as a shut-off member, 9, 10, 12 and 14 of the corner valve, require only a low structural height. In particular, the length of valve spindle 10 with respect to the structural height remains totally without any influence thereon. The pneumatically-driven actuating member 6 for the other interiorly-mounted container valve may be mounted deep inside the container. This results in a particularly compact structure which meets the requirement concerning a low structural height. Of course, the actuating member may also be mounted at a slight distance above the container while still satisfying the requirements of relatively low structural height.

For filling or emptying container 30 the aforementioned loading line will be coupled to flange 5. By means of a handle (for example, a ratchet handle) mounted on the valve spindle 10, the shut-off or locking member 9 of the angle valve is opened relative to valve seat 14, and finally the inner second container valve 31 is opened by pneumatically-actuating the actuating member 6 through connecting opening 16. After finishing the filling or emptying procedure, the closing of the two container valves is carried out in the opposite sequence.

Figure 4:
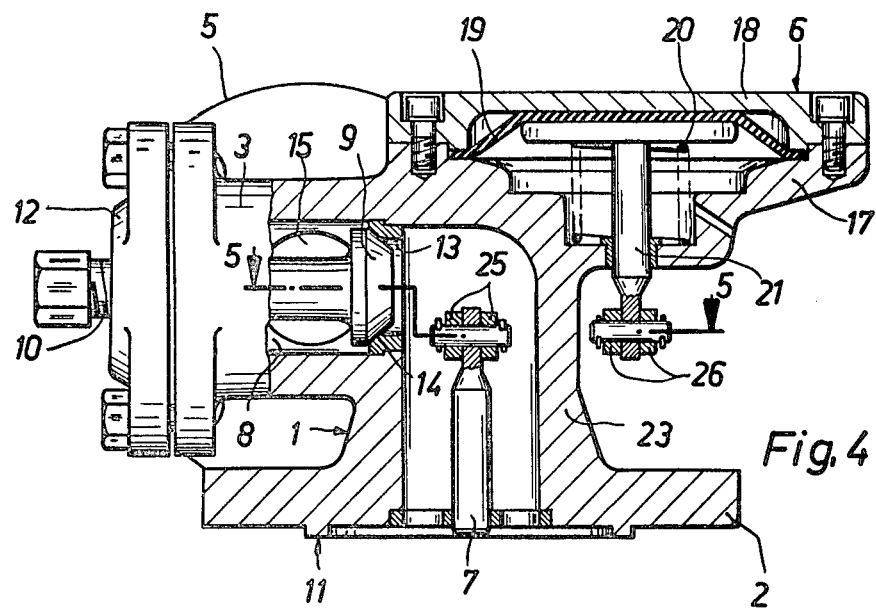
FIG. 4 is a sectional view, in part elevation, of an alternate embodiment of the present invention taken along line 4—4 of FIG. 5.
Figure 5:
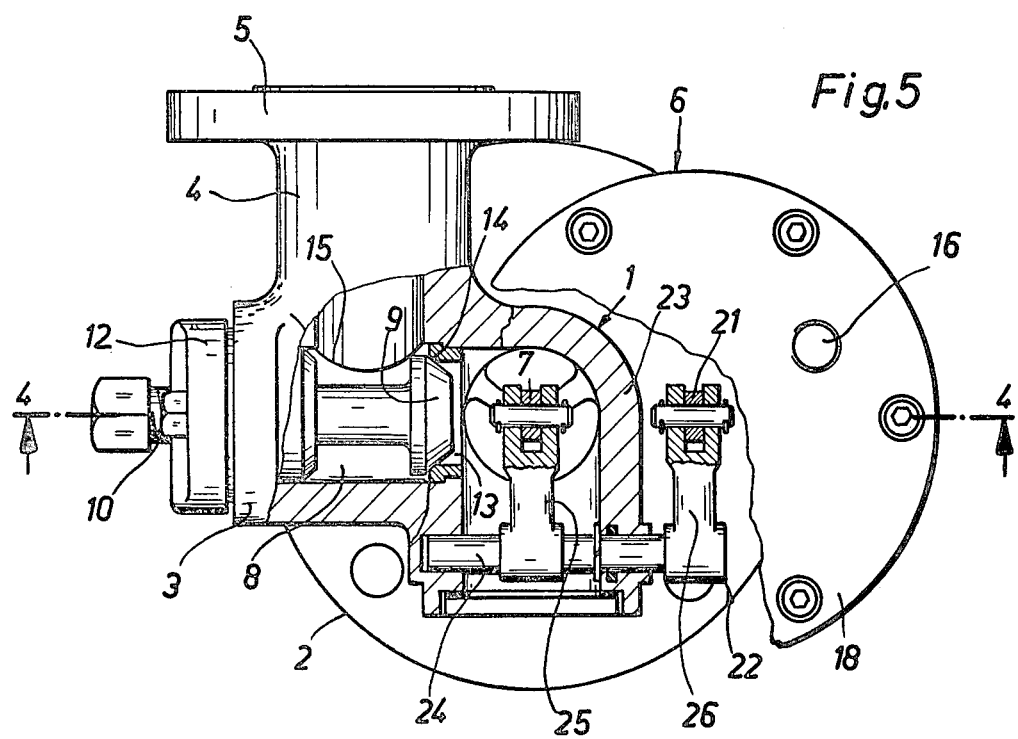
FIG. 5 is a plan view of the angle valve shown in FIG. 4, and partially sectioned along line 5—5 of FIG. 4.

In the valve embodiment according to FIGS. 4 and 5, the housing for forming the actuating means 6 is provided with a shell 17 which is eccentrically positioned outside container-side connecting piece 1. The opening of the shell which faces away from connecting front face 11 of connecting piece 1 is covered by a cover 18. Between cover 18 and shell 17 an operating membrane 19 is clamped therebetween which is under the influence of a return spring 20 and which acts on a stroke shaft 21. The latter is coupled with actuating plunger 7 by means of a stroke transmission member 22. The stroke transmission member 22 is composed of a transmission shaft 24 which extends through the sealed connecting piece wall 23 of connecting piece 1 and two crank arms 25 and 26 mounted on transmission shaft 24. One of the crank arms is mounted within connecting piece 1 and coupled with actuating plunger 7, while the other one is mounted outside of connecting piece 1 and coupled with stroke shaft 21.

Actuating member 6 is mounted eccentrically offset from connecting piece 1 at a position substantially away from the connecting piece but is substantially mounted within the bounds of the structural length of the connecting piece 1. Therefore, the structural height of the actuating member 6 increases only to a slight extent the structural length of the connecting piece, so that a particularly low total structural height of the corner valve is realized. For filling or emptying the container the same method is used as described for the valve according to FIGS. 1-3.

Figure 6:
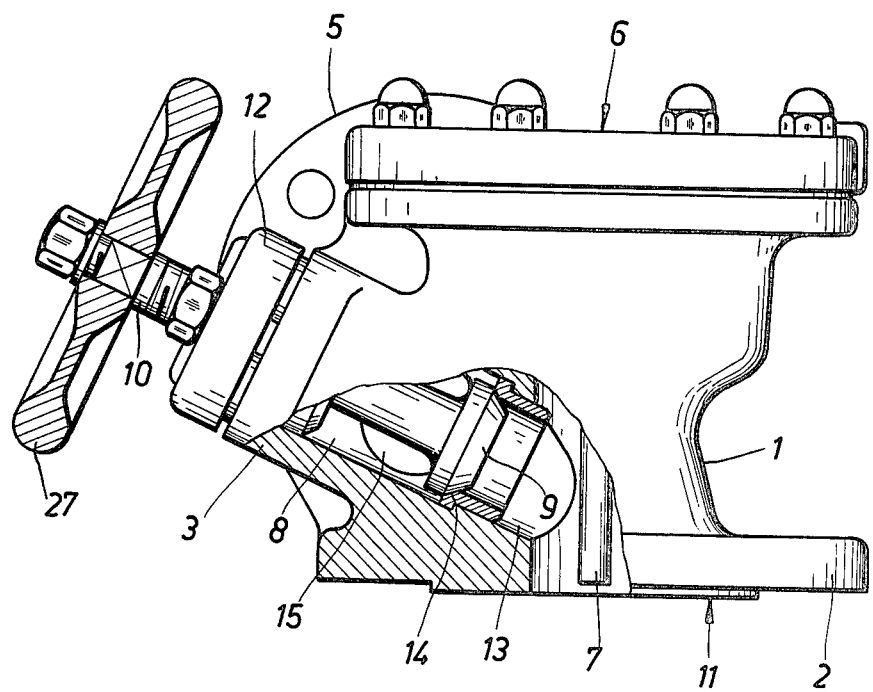
FIG. 6 is a side elevational view, in part section, of a further embodiment of the invention.

In contrast to the embodiment of the valve shown in FIG. 1, in the embodiment of the valve shown in FIG. 6, the valve spindle 10 does not run parallel with respect to the connecting front face 11 of connecting member or container-side connecting piece 1, but rather, runs at an inclined angle thereto. In view of the fact that the valve spindle 10 ascends to its outer free end, the spindle end has sufficient freedom with respect to the bottom of the container, so as to support a valve handle 27 for manual actuation. The angle of divergence between the valve spindle 10 and the connecting front face 11 is so low that the valve handle 27 does not extend or at least does not substantially extend over the remainder portion of the valve, in particular, the actuating device 6 and the flange 5. In practice, the angle of divergence will not normally exceed 45 degrees. The valve handle 27 which is fixed to the valve spindle 10 offers a very convenient operation, and eliminates the need for a handle for the valve spindle 10 at the loading and discharging location.

While only a few embodiments of the present invention have been shown and described, it will be obvious to those persons of ordinary skill in the art, that many changes and modifications may be made thereunto, without departing from the spirit and scope of the invention.

What is claimed is:

1. An angle valve mountable on the exterior of a container having a container valve disposed therein, comprising:

a unitary housing including a container-side connecting member having a front face and a channel formed therein opening onto said front face for communication with said container and a loading-side connecting member, which has a channel formed therethrough and which is capable of communication with a loading line, said valve housing further including an intermediate connecting member mounted on said container-side connecting member and extending radially therefrom, said intermediate connecting member having a free end on which is mounted a support for supporting a valve spindle and a receiving chamber formed therein which establishes communication between said channels of said loading-side and said container-side connecting members, with said channel of said loading-side connecting member disposed to terminate and discharge directly into said receiving chamber and with said loading-side connecting member disposed tangentially relative to said container-side connecting member and extending radially outwardly from said intermediate connecting member between said support and said container-side connecting member, said loading-side connecting member having an axis which is disposed at a fixed angle to said front face and also having an inner end coupled to said intermediate member and an outer end ascending away from said front face;

a valve seat mounted within said receiving chamber;

a stroke-adjustable valve head mounted within said receiving chamber and disposed for cooperative engagement with said valve seat, said valve head being disposed laterally adjacent to said container-side connecting member so as to leave said channel of said container-side connecting member unobstructed for the receipt therein of an actuating plunger;

an actuating plunger which is disposed in and extends through said channel of said container-side connecting member for coupling with the container valve disposed in the container;

a pneumatically operable actuating member supported on said housing and coupled to said actuating plunger; and a manually-adjustable valve spindle at least partially mounted in said receiving chamber and having an inner end coupled to said valve head and an outer free end supported by said support, said valve spindle being mounted with its axis substantially parallel to the axis of said intermediate member and at an angle to said front face of said container-side connecting member such that its outer free end does not extend substantially above said actuating member and said loading-side connecting member, said spindle being adjustable to control communication between said container-side connecting channel and said receiving chamber.

2. The valve according to claim 1, wherein the maximum angle between the axis of said valve spindle and said front face of said container side connecting member is 45 degrees.

3. The valve according to claim 1, wherein said outer free end of said valve spindle has a valve handle secured thereto which does not extend substantially above said actuating member and said loading-side connecting member.

4. The valve according to claim 1, wherein said intermediate connecting member has a support for supporting said valve spindle which does not extend substantially above said actuating member and said loading-side connecting member.

5. The valve according to claim 1, wherein said receiving chamber has a first discharge opening communicating with said channel of said container-side connecting member and a second discharge opening communicating with said channel of said loading-side connecting member, the axes of which openings are disposed substantially at a right angle with respect to each other.

6. The valve according to claim 5, wherein said valve seat is disposed in said first discharge opening.

7. The valve according to claim 1, wherein said actuating member is disposed laterally offset with respect to said container-side connecting member and includes a stroke shaft which is disposed outwardly of, and adjacent to, said container-side connecting member and which is disposed substantially parallel to said plunger and a stroke transmission member coupling said stroke shaft to said plunger and wherein said container-side connecting member has a sealed wall through which said stroke transmission member extends.

8. The valve according to claim 7, wherein said actuating member includes a shell eccentrically mounted on said container-side connecting member, a cover secured to said shell and a pneumatically-actuated membrane clamped between said cover and said shell which is coupled to said stroke shaft for effecting movement thereof.

9. The valve according to claim 7, wherein said stroke transmission member includes a transmission shaft extending through said sealed wall, a first crank arm disposed within the channel of said container-side connecting member and coupled to said transmission shaft and to said plunger and a second crank arm disposed outside of said container-side connecting member and coupled to said transmission shaft and said stroke shaft.

10. The valve according to claim 7, wherein said stroke transmission member includes a lever pivotably mounted on said housing and extending through a wall of said container-side connecting member, said lever having an inner end which is coupled with said actuating plunger and an outer end which is coupled to said stroke shaft.

* * * * *